Jan. 27, 1942.  L. R. SPENCER  2,271,163
AIRCRAFT CONSTRUCTION
Filed March 11, 1940  3 Sheets-Sheet 2
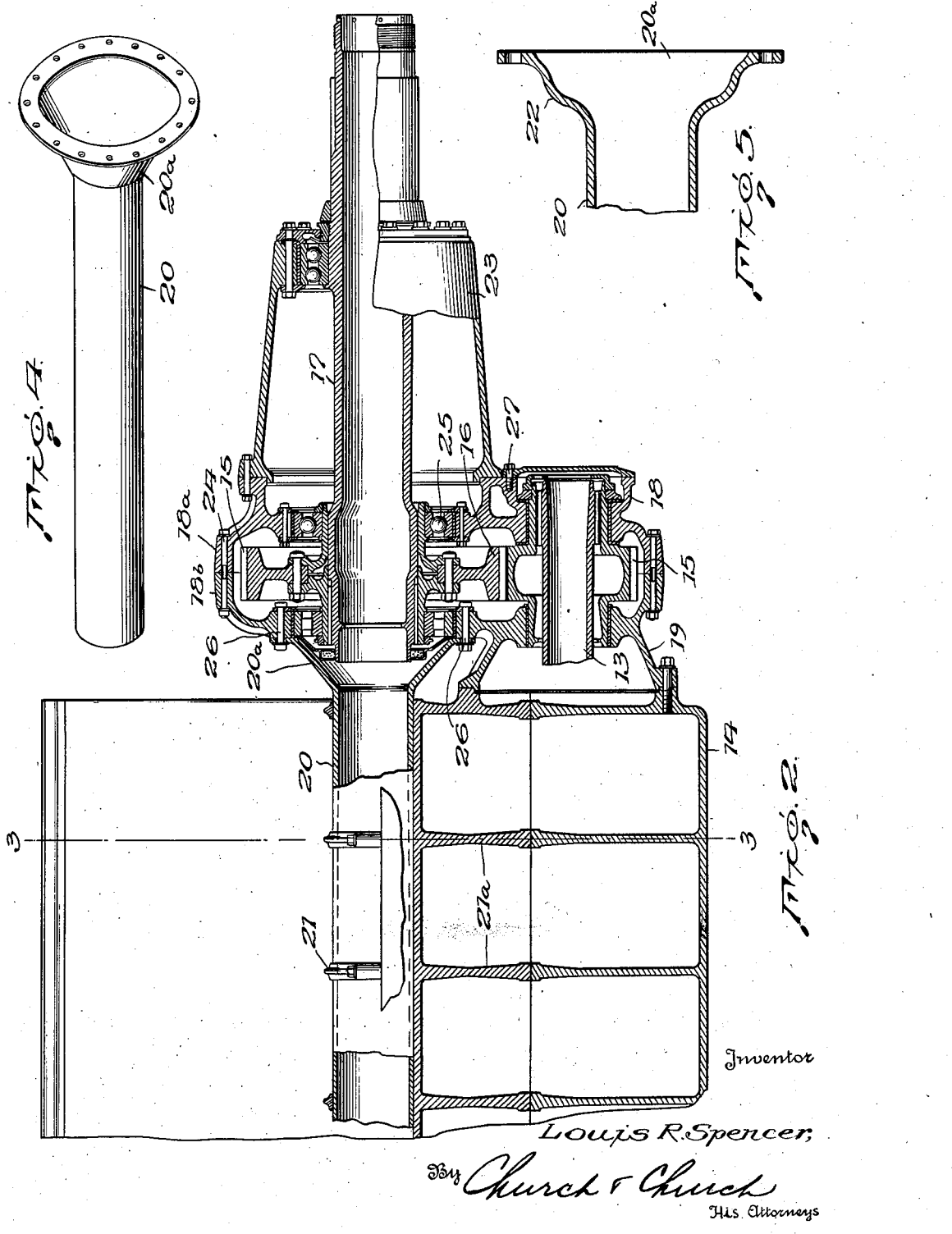
Inventor
Louis R. Spencer,
By Church & Church
His Attorneys

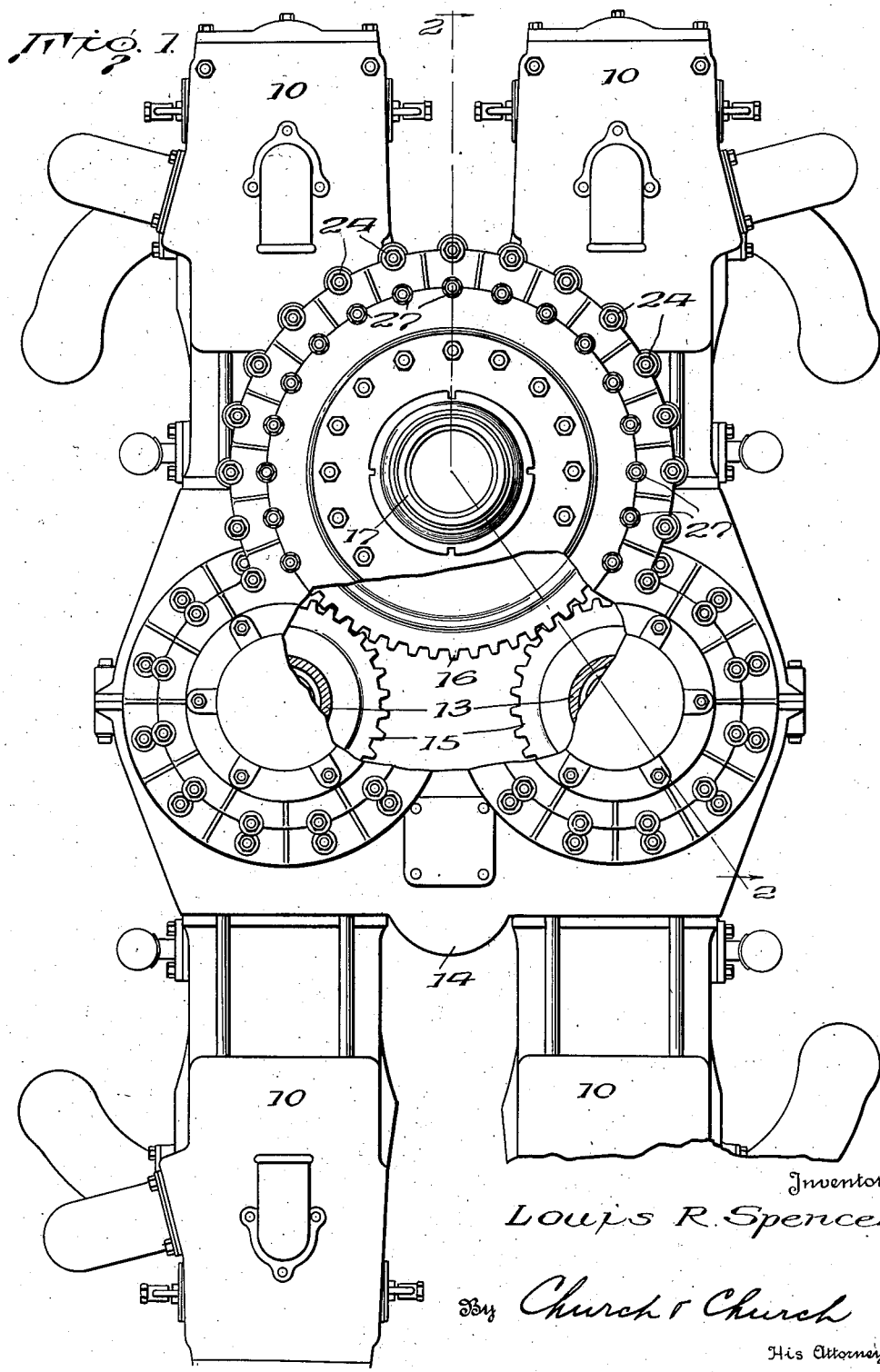

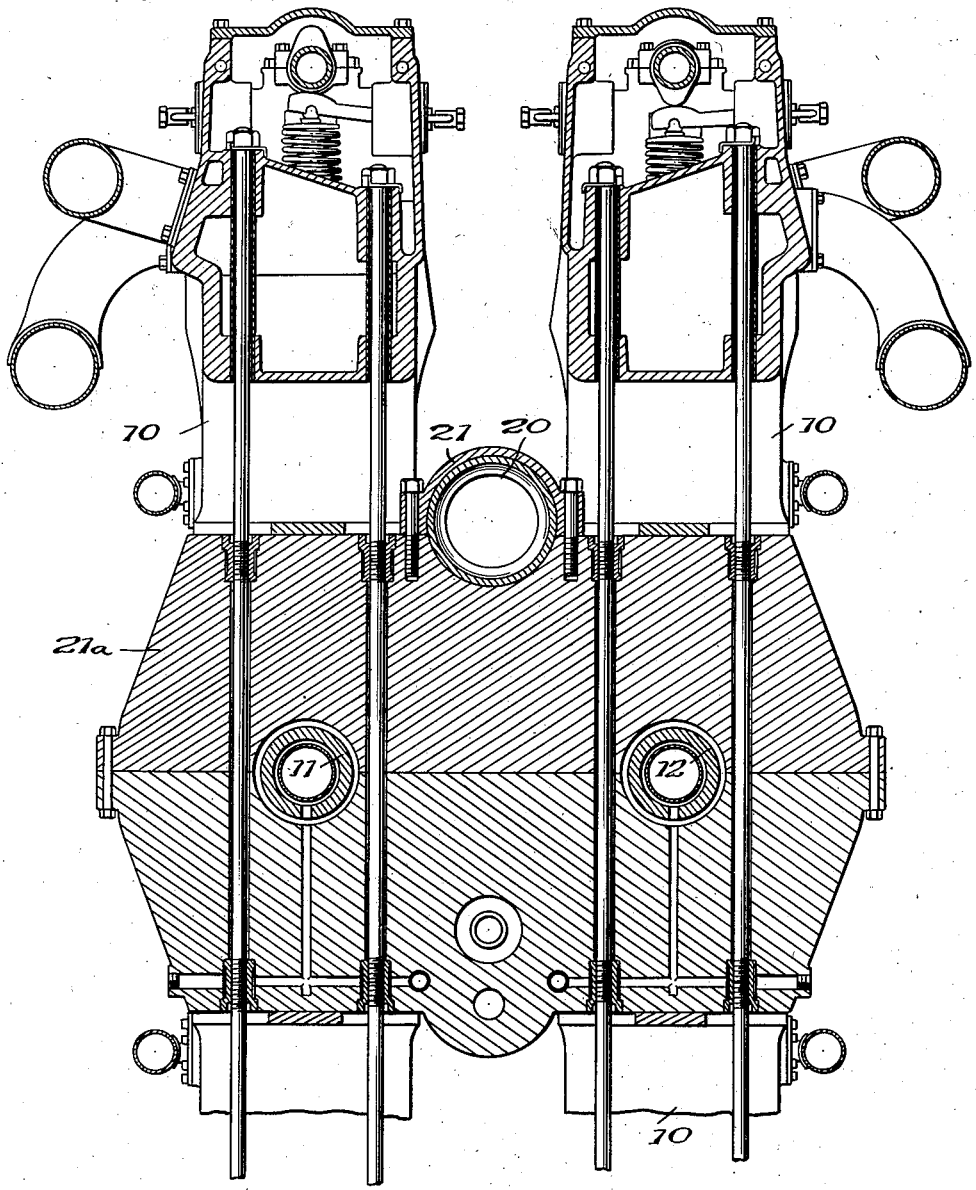

Patented Jan. 27, 1942

2,271,163

UNITED STATES PATENT OFFICE 2,271,163

AIRCRAFT CONSTRUCTION

Louis R. Spencer, West Hartford, Conn., assignor to Spencer Aircraft Motors, Inc., Hartford, Conn., a corporation of Connecticut Application March 11, 1940, Serial No. 323,436

4 Claims. (Cl. 60—97)

This invention relates to improvements in aircraft construction.

The continued refinement of aircraft indicates the desirability of improving the streamline contour of the craft, a result which has been made somewhat difficult of accomplishment by reason of the fact that the use of large horse power aviation engines renders it necessary to provide a reduction gearing for the propeller drive. The primary object of the present invention, therefore, is to provide an aircraft construction wherein the desired streamlining effect is accomplished with the gear housing projecting forwardly in an extended nose from the body proper but amply supported on or in advance of the aircraft body. Thus, the forwardly extending gear box or housing facilitates streamlining of the craft as a whole.

Again, the recently developed controllable pitch propellers equipped with three or four blades, combined with the gear box, aggregate quite a weight which, together with the torsional strains due to power transmission, exert a tremendous load upon the extended nose that is provided for streamlining effect. A further object of the present invention, therefore, is to provide an aircraft construction in which the gear box and propeller shaft are firmly secured in advance of the body of the craft itself so as to be fully capable of withstanding the excessive loads placed upon these extended portions.

A still further object of the invention is to provide supporting means for the forwardly extending portions of the structure, i. e., the gear housing and propeller shaft, said support means taking such form as to lend to the use of the craft for military purposes in that the supporting means and propeller hub or shaft provide an unobstructed passage for the use of a machine gun or other ordnance.

More specifically, the invention is especially designed for use in conjunction with aircraft having a power unit which might be described as consisting of two inline motors. For instance, with the H-type motor unit, the crank shafts are disposed parallel to each other. A bell-shaped support for the gear housing is provided at the front end of each crank shaft at points well below the thrust line of the propeller shaft which is located in a vertical plane midway the two crank shafts and, in carrying out the present invention, a tubular member, preferably formed of a flared forward end, is mounted on the engine block in alinement with the propeller shaft, which is also preferably tubular. The forward, flared end of this tubular supporting member provides ample support for the upper portion of the gear housing which is attached thereto. Preferably, the crank case of the motor unit is provided with a longitudinal groove in which this tubular supporting member is fitted and secured. Thus, this supporting, tubular member not only serves as a support for the upper portion of the gear housing but, once in position, it absorbs the thrust of the propeller and functions as a "backbone" for the crank case to assure bearing alinement for the crank shafts.

With these and other objects in view, the invention consists in certain details of construction and combinations and arrangements of parts, all as will hereinafter be more fully described and the novel features thereof particularly pointed out in the appended claims.

In the accompanying drawings illustrating the preferred embodiment of the invention—

Figure 1 is a front elevational view, partly broken away, of a motor unit, gear housing and propeller shaft, assembled in accordance with the present invention;

Fig. 2 is a sectional view on the line 2—2 of Fig. 1;

Fig. 3 is a transverse sectional view on the line 3—3 of Fig. 2;

Fig. 4 is a detail perspective view of the tubular supporting member; and

Fig. 5 is a sectional view of the forward end of a modified form of tubular supporting member.

The so-called H-type of engine, used for purposes of illustration in the present instance, may be described generally as comprising a plurality of cylinders 10 arranged in pairs at opposite sides of the driven shaft which, in the present instance, is the propeller shaft. The pistons (not shown) for the several cylinders at opposite sides of the propeller shaft are connected to crank shafts 11, 12, and each of these crank shafts is provided with an extension 13 projecting forwardly beyond the crank case or base 14 of the power unit. The extensions 13 of the crank shafts are each provided with a gear 15 and these crank shaft gears mesh with a gear 16 on the propeller shaft or driven shaft 17. In order to properly support the propeller shaft and the crank shaft extensions and, at the same time, to impart a streamlined effect to the structure as a whole, there is a housing 18 mounted forwardly of the crank case and in which the gearing between the crank shafts and propeller shaft is housed. In cross-section, this housing is composed of three parti-circular portions which, as a whole, present a substantially triangular formation or contour when viewed endwise or in front elevation as in Fig. 1. The gear housing is preferably formed of forward and rear sections 18$^a$, 18$^b$, suitably secured together by bolts 24, and the rear section 18$^b$ is formed with flared or bell-shaped extensions 19 on its lower, parti-circular portions, which bell-shaped portions each surround one of the crank shaft extensions 13 and are secured to the forward wall of the crank case by suitable bolts. These bell-shaped portions are well below the thrust line of the propeller shaft 17, whose rear end, carrying the gear 16, is journaled in bearings, such as shown at 25, in one or both of the casing sections 18a, 18b.

To more firmly maintain the gear housing 18 in its position forwardly of the crank case and, in addition, to provide means for absorbing the thrust imposed on the propeller shaft by the propeller, the present invention comprises what might be termed a combined supporting and thrust-absorbing member 20, rigidly mounted on the crank case in alinement with the propeller shaft and to which the upper portion of the gear housing its rigidly attached by bolts 26. Preferably, this supporting and thrust-absorbing member is of tubular formation especially where the craft is for military use, and it is desired to mount a machine gun or other ordnance in position to fire through the propeller shaft. It will also be appreciated that use of a supporting and thrust-absorbing member of tubular formation tends to reduce weight without sacrificing strength.

This supporting element 20 is rigidly secured on the crank case in alinement with the propeller shaft by means of clips 21, the crank case preferably being formed with a longitudinally extending groove in which the supporting member 20 seats. The clips 21 should be arranged in registry with the partitions 21a in the crank case. Where a cylindrical, steel tube is used as such supporting member, this groove would preferably be substantially semi-circular and would be located centrally between the cylinder blocks. It will be apparent that, with the tube once in place on the crank case, it will not only serve as a "backbone" for the latter to assure proper bearing alinement for the crank shafts, but it will also absorb thrust strains of the propeller. In order to enlarge the bearing area of the supporting tube 20 against the rear face of the gear housing 18, it is preferred that the front end portion 20a of the tube be bell-shaped or flared outwardly, as best seen in Figs. 2 and 4. Also, if desired, this bell-shaped or flared portion may be formed with one or more corrugations 22, as illustrated in the fragmentary view of Fig. 5.

The streamlined effect of the assembly as a whole can be further carried out by the provision of a forwardly tapering casing 23 around the propeller shaft in front of the gear housing 18 to which it is secured by bolts 27.

With the lower portion of the gear housing 18 supported by attachment of its lower, bell-shaped portions 19 to the front of the crank case at opposite sides of the vertical plane in which the propeller shaft is located and with the upper portion of said gear housing supported from the bell-shaped, forward end of the supporting tube 20, it will be readily seen that a substantially three-point support of great rigidity is provided for carrying the propeller load and this without obstructing the passage through the propeller shaft in the event the craft is designed for military uses. As previously stated, this arrangement permits the propeller to be placed well in advance of the craft, with the reduction gearing located at a point intermediate the front of the crank case and the propeller, and the whole assembly substantially streamlined. It might be added that, with the use of a corrugated, flared, forward end for the supporting tube 20, this bell-shaped supporting portion possesses a certain amount of elasticity, so as to reduce the possibility of fracture. It will, of course, be appreciated that the cross-sectional shape of the supporting member 20, and particularly that part overlying the crank case, may take various cross-sectional shapes and, where the crank case is grooved for reception of this member, the cross-sectional contour of the groove will depend upon the shape of the supporting member.

What I claim is:

1. A propeller shaft mounting for aircraft in which the power unit comprises a crank case, a wholly separable gear housing located in front of said crank case, and a propeller shaft bearing in said housing, said propeller shaft mounting having, in combination, a cylindrical member provided with a forwardly flaring front end portion, means for securing said gear housing to said enlarged portion, said crank case having a longitudinally extending depression therein formed with an extended linear bearing surface for said cylindrical member, and means for rigidly securing said cylindrical member in said depression.

2. A propeller shaft mounting for aircraft whose power unit comprises a crank case, a wholly separable gear housing located in advance of the crank case and a tubular propeller shaft journaled in said housing, said propeller shaft mounting having, in combination, an elongated tubular member mounted on the crank case in alinement with the propeller shaft, said crank case having a longitudinal depression therein in which said tubular member is seated, said tubular member having an extended linear bearing in said longitudinal depression means for rigidly securing said member in said depression, and means for securing said housing to the forward end portion of said member.

3. In a propeller shaft mounting for aircraft whose power unit comprises a crank case, a wholly separable gear housing located in advance of the crank case and a tubular propeller shaft journaled in said housing, said propeller shaft mounting having, in combination, a tubular member mounted on the crank case in alinement with the propeller shaft, said crank case having a longitudinal depression therein formed with an extended linear bearing surface for said tubular member is seated, means for securing said member in said depression, said member having a flared forward end portion, and means for securing said housing to said flared portion of said member.

4. Supporting means for the propeller shaft of aircraft whose power unit comprises a crank case, a pair of laterally spaced crank shafts projecting forwardly beyond the crank case, a wholly separable gear housing surrounding the projecting crank shafts, and a propeller shaft journaled in said housing, said propeller shaft supporting means having, in combination, a supporting member extending longitudinally of the upper surface of the crank case in axial alinement with the propeller shaft, said member having an extended linear bearing on said crank case with its forward end projecting beyond the crank case, and means for securing the housing to the projecting forward end of said member.

LOUIS R. SPENCER.